United States Patent
Graumann et al.

(10) Patent No.: US 9,321,349 B2
(45) Date of Patent: Apr. 26, 2016

(54) CONFIGURABLE CONTROL PANELS

(75) Inventors: David L. Graumann, Portland, OR (US); Jennifer Healey, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/977,598

(22) PCT Filed: Dec. 29, 2011

(86) PCT No.: PCT/US2011/067857
§ 371 (c)(1),
(2), (4) Date: Apr. 25, 2014

(87) PCT Pub. No.: WO2013/101074
PCT Pub. Date: Jul. 4, 2013

(65) Prior Publication Data
US 2014/0297105 A1    Oct. 2, 2014

(51) Int. Cl.
*B60K 37/06* (2006.01)
*G06F 3/042* (2006.01)

(52) U.S. Cl.
CPC .............. *B60K 37/06* (2013.01); *G06F 3/0421* (2013.01); *B60K 2350/1016* (2013.01); *B60K 2350/945* (2013.01)

(58) Field of Classification Search
CPC .................... G06F 2203/04809; G06F 3/0426; G06F 3/0421; B60K 2350/1024; B60K 2350/1028; B60K 2350/1032; B60K 2350/945; B60K 2350/1016; B60K 37/06
USPC ......................................... 345/175
See application file for complete search history.

(56) References Cited

U.S. PATENT DOCUMENTS

| | | | |
|---|---|---|---|
| 6,593,530 B2 | 7/2003 | Hunt | |
| 7,821,718 B1* | 10/2010 | Govyadinov et al. | ......... 359/624 |
| 2002/0061217 A1* | 5/2002 | Hillman | ................ G06F 3/0202 400/489 |
| 2007/0013662 A1* | 1/2007 | Fauth | ............................ 345/168 |
| 2010/0127847 A1* | 5/2010 | Evans | ................. G06F 3/04817 340/461 |

FOREIGN PATENT DOCUMENTS

| | | |
|---|---|---|
| CN | 101801706 | 8/2010 |
| CN | 201600575 | 10/2010 |
| JP | 61-200718 A | 9/1986 |
| JP | 62-037231 A | 2/1987 |
| JP | 02-189834 A | 7/1990 |
| WO | 2013/101074 A1 | 7/2013 |

OTHER PUBLICATIONS

International Preliminary Report on Patentability and Written Opinion received for PCT Patent Application No. PCT/US2011/067857, mailed on Jul. 10, 2014, 8 pages.
International Search Report and Written Opinion received for PCT Application No. PCT/US2011/067857, mailed on Sep. 5, 2012, 11 pages.
Office Action for Chinese Application No. 201180076053.6 mailed Nov. 25, 2015. 8 pages Chinese Office Action, 15 pages English Translation.

* cited by examiner

*Primary Examiner* — Yonel Beaulieu
*Assistant Examiner* — Aaron L Troost
(74) *Attorney, Agent, or Firm* — Sutherland Asbill & Brennan LLP

(57) ABSTRACT

Control panels with controls for controlling components that are reconfigurable by a user by selective placement of tiles corresponding to each of the controls and components. The controls can further be actuated by detecting an object and its motion in proximity of the selectively placed tiles.

26 Claims, 7 Drawing Sheets

CONFIGURABLE CONTROL PANELS

TECHNICAL FIELD

This invention generally relates to methods, systems, and apparatus for control panels, and more particularly configurable control panels.

BACKGROUND

Drivers of vehicles, such as cars, may need to control several components of the vehicle for purposes of safety, comfort, or utility. As a result, vehicles typically have several controls to control one or more components of the vehicle. Some common controls in vehicles may include, for example, radio controls to set tuning or volume, heater controls to set the level of heat, and defroster controls to set the level of defrosting of windows of the vehicle.

Oftentimes, conventional controls on vehicles may be organized in clusters. For example, passenger cars may have a center console between the driver's side and the passenger's side within the cab at the front of the car where several control surfaces and interfaces are placed. Controls for the radio, navigation system, heater air conditioners, and other components are often provided on the center console.

The center console, in many cases, may be crowded with controls due to the large number of components in modern vehicles that need to be controlled or otherwise require user interaction. Oftentimes, the center console may extend from the dashboard of the vehicle at its top to the transmission tunnel at its bottom to fit all the controls required on the vehicle. Some locations on the control panel may be more convenient and safer for a driver to reach than other locations on the control panel. Current center consoles, furthermore, have controls that are fixed in place. In other words, a particular control is set in a particular location on the surface of the center console of the vehicle. The location of controls on the vehicle are typically preconfigured by a party other than the end user, such as the vehicle manufacturer. Therefore, a vehicle manufacturer, to provide the most convenient location for each of the controls, may try to anticipate the most frequently used controls and try to place the most frequently used controls in locations that are most convenient to a user. Although vehicle manufacturers may try to make control clusters, including the center console, within the vehicle as user friendly as possible, it may not be possible for the vehicle manufacturer to provide a control interface configuration that is to every end user's convenience.

Current control clusters, such as the center console, may not be easy modify terms of adding additional control infrastructure. For example, if one wants to add control functionality of one's smart phone to a vehicle control surface, it may be difficult to do and may involve providing new control interfaces and wiring to enable the additional functionality.

Typical control clusters and control surfaces on vehicles generally have a switch or other user input interface electrically coupled to electronic device, such as a controller, via wiring to determine the switches or interfaces that are being actuated and translate the same to a controllable function. Therefore, each control interface of the vehicle may have dedicated wiring or dedicated controller hardware. As such, the controls may be difficult to reconfigure and personalize. Furthermore, the controls and associated hardware add weight to a vehicle, which is undesirable, and may be expensive to implement due to considerable dedicated electrical infrastructure provided therefore. Additionally, repairs to vehicle controls may be relatively difficult as the repairs may require troubleshooting the electrical infrastructure associated with each of the controls.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Embodiments of the invention are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide apparatus, systems, and methods for reconfigurable control panels. In one aspect, user interactive controls associated with components of a vehicle may be provided on a control surface of a vehicle and may be selectable and moveable by the user of the vehicle. The control interface may include tiles that may be selectively mounted on a control cluster or control panel, such as a center console of a vehicle. The tiles may have an indicia disposed thereon for identification of the tile. A user may touch or gesture in proximity of one or more of the tiles to activate or control components associated with the tile. In certain aspects, the mounted tiles may be free of electrical connections. In other aspects, the selection of one or more of the tiles may be detected using a sensor, such as an image sensor. Signals from the sensor may be provided to a system that interprets the signal to determine a control function intended by the user of the control panel. In further aspects, the system may detect the presence of an object, such as a user's finger, in proximity of one or more tiles and determine a control function and associated signal based thereon and provide the same to a component of the vehicle. For some applications, an initial presence of an object, such as a user's finger, in proximity of one or more tiles may be followed by detecting a movement of the object to determine a control signal for one or more components of the vehicle.

With the virtual and reconfigurable control clusters, as disclosed herein, the control surfaces of the vehicle may be completely passive. All the controls may be interpreted by computer vision. Therefore, no mechanical switches, dials, electronics associated with sensing the actuation of a mechanical switch or dial, or the like may be needed. As a result, configurable control clusters may reduce the cost of any one or more of the control clusters, control infrastructure, the dashboard, or the vehicle.

Example embodiments of the invention will now be described with reference to the accompanying figures.

Figure 1:
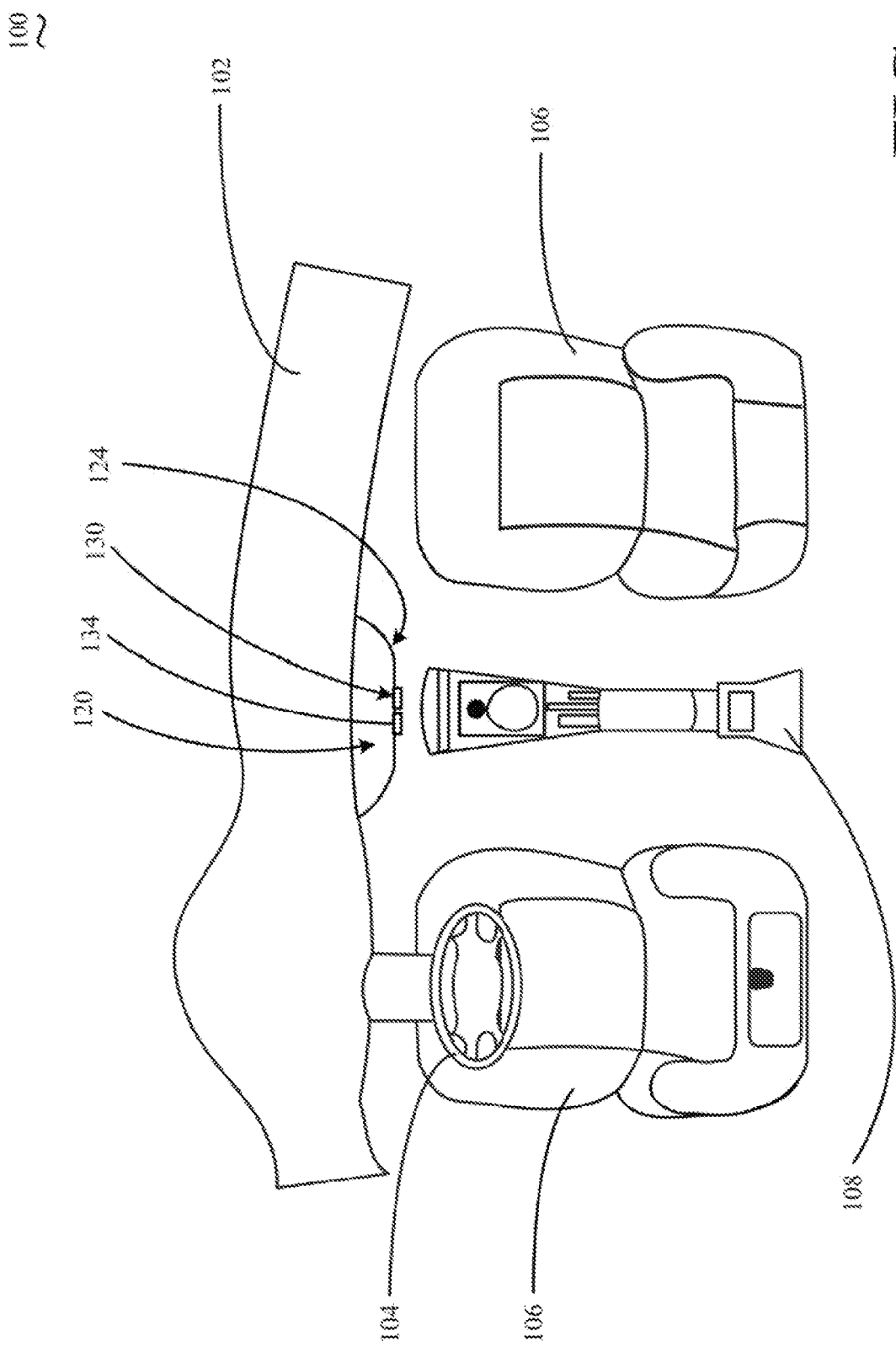
FIG. 1 is a simplified top-down schematic view illustrating an example vehicle cockpit 100 with vehicle controls that can be operated in accordance with embodiments of the disclosure.

Referring now to FIG. 1, an vehicle cockpit 100 may include a dashboard 102, steering wheel 104, seats 106, and a center arm rest 108. Extending out from the dashboard may be a control panel, such as a center console 120 that may include a front face 124. The center console 120 may further include an illumination source 130 and an image sensor 134. When a user of the vehicle, such as the driver of the vehicle, wishes to control components of the vehicle, such as a radio system or a heater, the user may interact with the center console 120 to effect such controls.

For the purposes of this discussion, the vehicle can include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, or any other suitable vehicle having a relatively closed cockpit. However, it will be appreciated that embodiments of the disclosure may also be utilized in other environments where control of components may be implemented. It should also be noted that although control elements of the vehicle are shown as a center console, control panels, or even single controls may be provided on any of the surfaces of the interior of the vehicle. For example, a control surface may be provided on any one of the dashboard 102, the steering wheel 101, the seats 106, the center arm rest 108, the doors (not shown), or the like.

Figure 2:
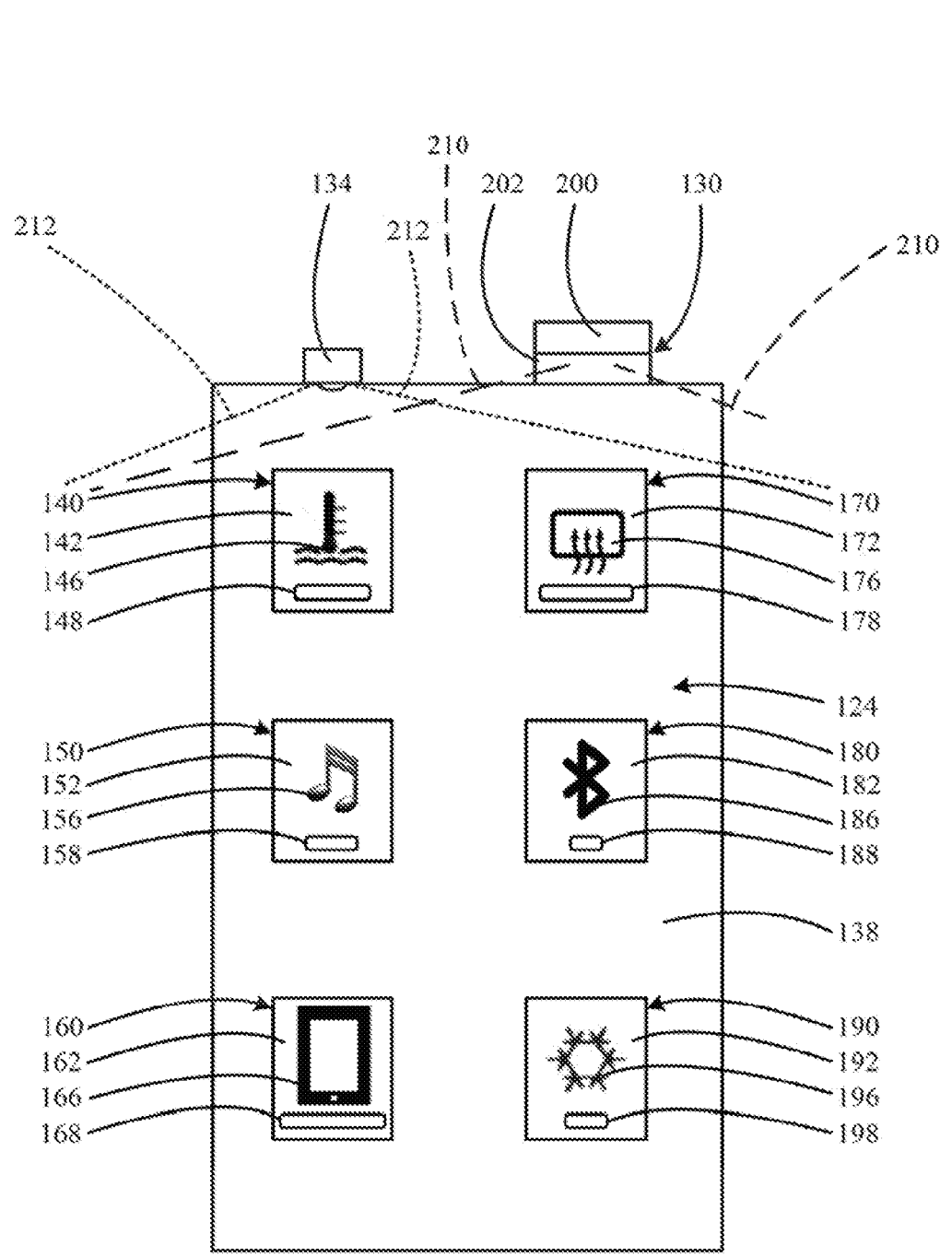
FIG. 2 is a simplified schematic diagram illustrating an example control panel of the vehicle of FIG. 1 operating in accordance with embodiments of the disclosure.

Referring now to FIG. 2, an illustrative center console 120 may include a front surface 138 of the front face 124 and a plurality of control tiles 140, 150, 160, 170, 180, and 190 mounted thereon. Each tile 140, 150, 160, 170, 180, and 190 may have a front surface 142, 152, 162, 172, 182, and 192, respectively, with an indicia 146, 156, 166, 176, 186, and 196, respectively, provided thereon. The indicia 146, 156, 166, 176, 186, and 196 may be indicative of a respective corresponding functionality of each of the tiles 140, 150, 160, 170, 180, and 190. For example, the thermometer indicia 116 of tile 140 may be indicative of a heater of the vehicle. Therefore, the tile 140 when mounted on the center console 120 may be associated with controlling the heater of the vehicle. Likewise, tile 150 may be associated with a sound system of the vehicle, tile 160 may be associated with a cellular telephone of the user, tile 170 may be associated with a defroster system 180 may be associated with a Bluetooth® controller, and tile 190 may be associated with an air conditioning system. The center console 120, tiles 140, 150, 160, 170, 180, and 190, and the associated indicia 146, 156, 166, 176, 186, and 196 may take any suitable shape and may be associated with any number of different controls provided to an occupant of a vehicle.

Each of the tiles 140, 150, 160, 170, 180, and 190 may further have a physical marker, such as a ridge 148, 158, 168, 178, 188, and 198 extending from the front surfaces 142, 152, 162, 172, 182, and 192, respectively. The physical marker 148, 158, 168, 178, 188, and 198 may be indicative of the respective corresponding functionality of each of the tiles 140, 150, 160, 170, 180, and 190 to the hardware and systems associated with the center console 120, as will be described with reference to FIGS. 6-8. In one aspect, the ridges 148, 158, 168, 178, 188, and 198 may be indicative of the functions and controls to which the respective tiles 140, 150, 160, 170, 180, and 190 of the control panel 120 are associated. Each of the ridges 148, 158, 168, 178, 188, and 198 may be unique and therefore may be uniquely identified with its respective tile 140, 150, 160, 170, 180, and 190, as well as functions and components associated therewith. The ridges 148, 158, 168, 178, 188, and 198 may have unique size, length, shape, protrusion from the respective front surface 142, 152, 162, 172, 182, and 192, or combinations thereof. As depicted in FIG. 2, each of the ridges 148, 158, 168, 178, 188, and 198 have a unique length and therefore may be identified by their unique length. For example, the ridge 148 may indicate that the tile 140 when mounted on the center console 120 may be associated with controlling the heater of the vehicle. Likewise, ridge 158 may indicate that tile 150 may be associated with the sound system of the vehicle, ridge 168 may indicate that tile 160 may be associated with the cellular telephone of the user, ridge 178 may indicate that tile 170 may be associated with the defroster system, ridge 188 may indicate that tile 180 may be associated with the Bluetooth® controller, and ridge 198 may indicate that tile 190 may be associated with the air conditioning system.

In certain embodiments, the ridges 148, 158, 168, 178, 188, and 198 may be of dissimilar lengths on each of the tiles 140, 150, 160, 170, 180, and 190. Further, in certain embodiments, the ridges 148, 158, 168, 178, 188, and 198 may be of dissimilar heights, or extensions form the front surface 142, 152, 162, 172, 182, and 192 on each of the tiles 140, 150, 160, 170, 180, and 190.

The front surface 142, 152, 162, 172, 182, and 192 on each of the tiles 140, 150, 160, 170, 180, and 190 may be substantially flush with the front surface 140 of the center console 120. Alternatively, the front surfaces 142, 152, 162, 172, 182, and 192 may protrude out above or be recessed relative to the front surface 140 of the center console 120.

Continuing on with FIG. 2, the illumination source 130 and the image sensor 134 may be provided near a top end of the front face 124 of the center console 120. In other embodiments, the illumination source 130 and the image sensor 134 may be provided at any suitable position relative to the front face 124 of the center console 120. For example, the illumination source 130 and the image sensor 134 may be located near a bottom or side ends of the front face 124 of the center console 120. As further alternatives, the illumination source 130 and the image sensor 134 may be placed at different sides of the front face 124 of the center console 120. The illumination source 130 may include an optical source 200 and an optical element 202 to generate an illumination plane or laser plane bound by the edges 210.

In certain embodiments, the optical source 200 may be an emitter of coherent radiation, such as a light amplification by stimulated emission of radiation (laser) device emitting a laser beam at one or more wavelengths. The wavelengths may be, for example, in the infrared region of the spectrum and therefore not visible to a user of the center console 120. Alternatively, the wavelength may be in the near near-ultraviolet (UV) range. As a further alternative, the wavelength of the optical source 200 may be provided in the visible range of about 380 nm to about 750 nm. The optical source 200 may be any known coherent radiation source including, but not limited to diode lasers, quantum well lasers, solid state lasers, gas lasers, or combinations thereof. In other embodiments, the optical source 200 may not be a source of coherent radiation. For example, the optical source 200 may be a light emitting diode (LED) emitting radiation at any variety of wavelengths.

The optical element 202 may be any variety or combination of lenses, reflectors, or waveguides. In certain aspects, the optical element 202 may be able to provide a radiation plane from a point or near-point optical source 200. In certain embodiments, the optical element 202 may be a Fresnel lens that provides a relatively wide dispersion of optical output from a relatively narrow optical input. In certain other embodiments, the optical element 202 may be a cylindrical lens that provides a relatively planar optical output from a relatively point-like optical source 200. In certain further embodiments, the optical element 202 may be a mechanical element that rasters or scans the output from the optical source to provide an laser plane.

In certain embodiments the laser plane, as bound by boundaries 210, may be in proximity to all of the tiles 140, 150, 160, 170, 180, and 190 on the front face 124. Furthermore, in certain embodiments the field of view of the image sensor 134, as bound by boundaries 212, may also be able to view all of the tiles 140, 150, 160, 170, 180, and 190 on the front face 124. As a result, the laser plane may be in proximity of the front surface 142, 152, 162, 172, 182, and 192 on each of the tiles 140, 150, 160, 170, 180, and 190 and the field of view of the image sensor may be such that the image sensor may detect light originating from near the front surface 142, 152, 162, 172, 182, and 192 on each of the tiles 140, 150, 160, 170, 180, and 190.

The image sensor 134 may be any known device that converts an optical image or optical input to an electronic signal. The image sensor 134 may be of any suitable variety including a charge coupled device (CCD), complementary metal oxide semiconductor (CMOS) sensors, or the like. The image sensor 134 may further be of any pixel count and aspect ratio. Furthermore, the image sensor 134 may be sensitive to any frequency of radiation, including infrared, visible, or near-UV. In one aspect, the image sensor 134 has a frequency range of sensitivity that includes the frequency of the illumination source 130.

While six tiles 140, 150, 160, 170, 180, and 190 are shown mounted to the front face 124 of the center console 120, there may be any number of tiles. Furthermore, there may be any amount of spacing between tiles in the vertical, horizontal, or diagonal directions in accordance with embodiments of the disclosure. As a non limiting example, in certain embodiments, there may be nine tiles arranged in a three tile by three tile arrangement. Additionally, the tiles 140, 150, 160, 170, 180, and 190 may be of any suitable shape.

It should also be noted, that while a single illumination source 130 and a single image sensor 134 are illustrated as part of the center console 120, there may be any number of illumination sources 130 and image sensors 134. For example, there may be two illumination sources, where each illumination source provides radiation of the same wavelength or a different wavelength. There may be two laser planes generated by the two illumination sources where each of the laser planes may comprise illumination of a different wavelength from each other. Furthermore, there may be a single image sensor that can detect both wavelengths. Alternatively, there may be provided two separate image sensors, each configured to detect only one of the wavelengths corresponding to one of the laser planes generated by one of the two illumination sources.

Figure 3:
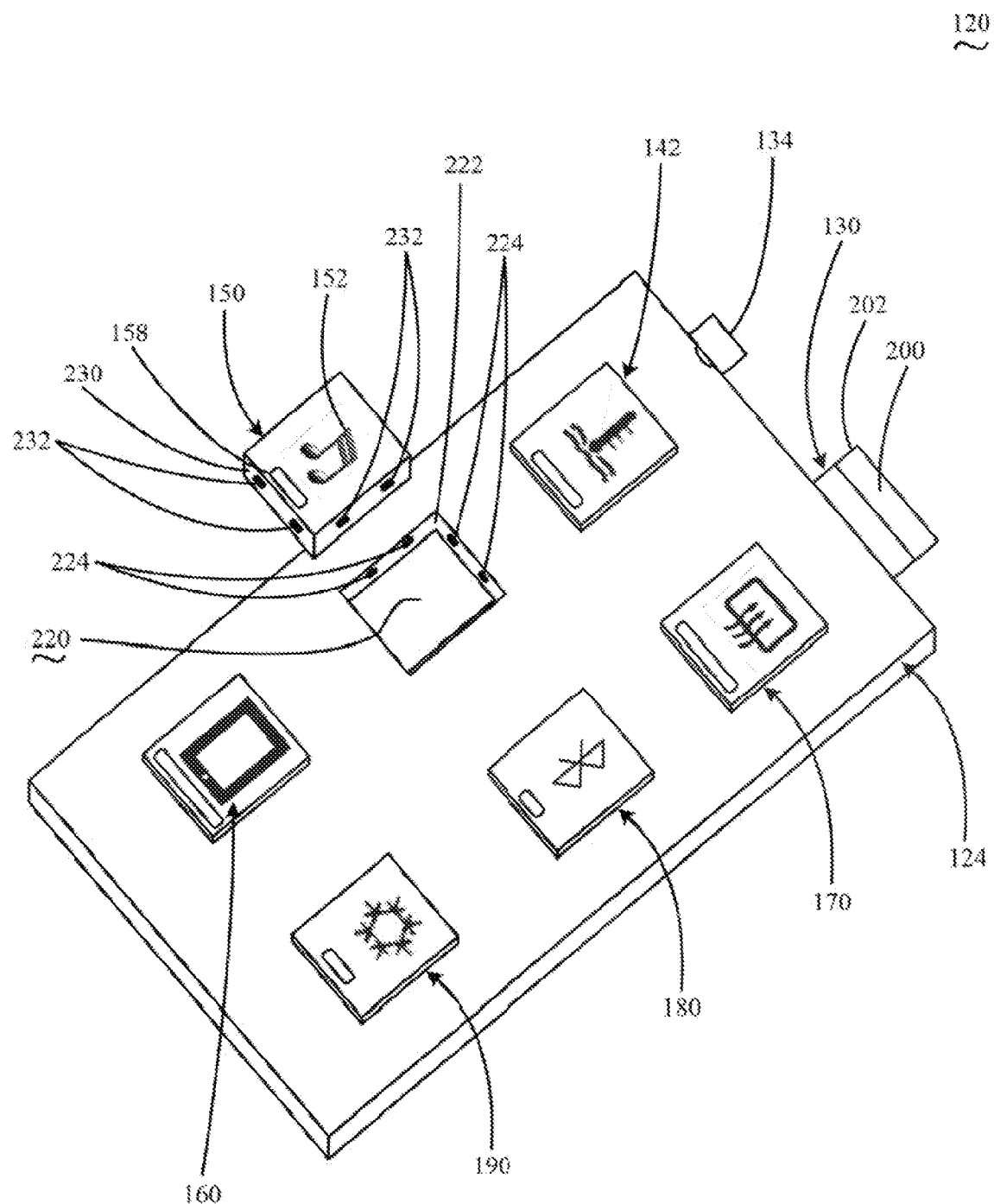
FIG. 3 is a simplified schematic diagram of the example control panel of FIG. 2 illustrating configurable control tiles provided thereon in accordance with embodiments of the disclosure.
Figure 4:
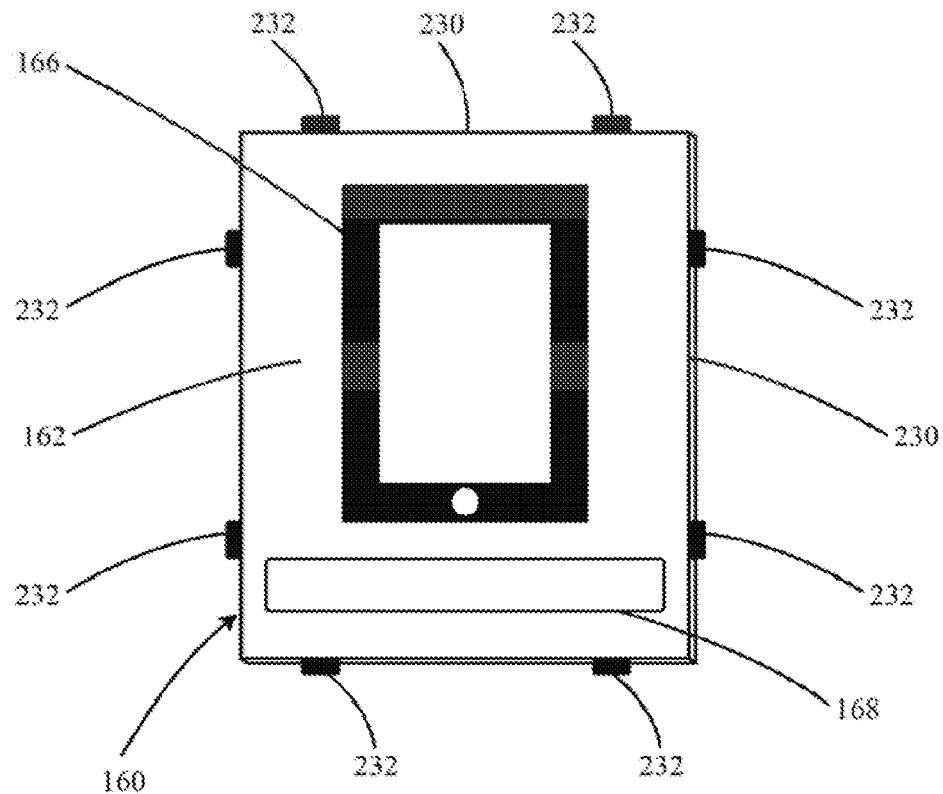
FIG. 4 is a simplified schematic diagram illustrating an example control tile for use with the example control panel of FIG. 2 in accordance with embodiments of the disclosure.

Referring now to FIGS. 3 and 4, the tiles 140, 150, 160, 170, 180, and 190 may be mounted, or "snapped-on" to the front face 124 of the center console 120 in recesses 220 within the front face 124. The recesses 220 may have sidewalls 222 with indentations 224 therein. Each of the tiles 140, 150, 160, 170, 180, and 190 may have a sidewall 230 with tabs 232 extending therefrom. When a user intends to mount a particular tile 140, 150, 160, 170, 180, and 190 to the front face 124, the user may insert the tile 140, 150, 160, 170, 180, and 190 into the cavity 220 in a manner such that the tabs 232 engage with the indentations 224 to hold the tile 140, 150, 160, 170, 180, and 190 in place on the front face 124.

It can be appreciated that the center console 120 can be reconfigured by removing, adding, or rearranging tiles 140, 150, 160, 170, 180, and 190 on the front face 124. During use, the user, such as the driver of the vehicle, may move one or more tiles 140, 150, 160, 170, 180, and 190 to locations on the front face 124 to create a center console 120 configuration that may be convenient to the user. Therefore, using the center console 120 in combination with the control tiles 140, 150, 160, 170, 180, and 190, the resulting control panels, control clusters, and control surfaces may be reconfigurable.

As a non-limiting example of reconfiguring the center console 120, a driver may decide to place the tile 190 corresponding to the air conditioner in relatively close proximity to the driver or in an otherwise convenient location on the front face 124 relative to the heater tile 140 during the summer, when the air conditioner may be used more frequently than the heater. Similarly, the same driver may decide to place the heater tile 140 in relatively close proximity to the driver or in an otherwise convenient location on the front face 124 relative to the air conditioning tile 140 during the winter when the heater may be used more frequently than the air conditioner.

As another non-limiting example of reconfiguring the center console 120, consider a user that prefers to use a cellular telephone in the vehicle rather than listening to the radio. The user may choose to place the telephone tile 160 in a more convenient location on the center console 120 than the music tile 150. There may be a different user that prefers to listen to music, rather than using a cellular telephone in the vehicle while driving. This second user may place may choose to place the music tile 150 in a more convenient location on the center console 120 than the telephone tile 160.

Therefore, the center console 120, and control panels in general, within a vehicle may be reconfigured and customized based at least in part on user preferences and behavior, environmental factors, or components available on the vehicle. For example, a user may not include a Bluetooth® tile 190 on the center console 120, if the vehicle does not have a Bluetooth controller component. Additionally, it should be noted that with the control panels with tiles 140, 150, 160, 170, 180, and 190, as disclosed herein, one does not have to use a predetermined control layout as provided by the manufacturer of the vehicle. One can customize the control panel to one's convenience. Furthermore, manufacturers may provide a pre-set list of potential functionality that the driver or user may assign to the tiles. Therefore a reconfigurable control surface may provide greater convenience, safety, usability, and lower cost, relative to predetermined and non-configurable control surfaces.

The tiles 140, 150, 160, 170, 180, and 190 may be constructed using lightweight thermoplastic materials such as polyethylene terephthalate (PET), poly-vinyl chloride (PVC), polytetrafluoroethylene (PTFE), polymethyl methacrylate (PMMA or acrylic glass), polyethylene (PE), or the like. In certain embodiments, the tiles 140, 150, 160, 170, 180, and 190 may be formed by molding processes, such as injection molding. Alternatively, the tiles 140, 150, 160, 170, 180, and 190 may be formed using extrusion processes. The use of various polymeric materials, including thermoplastic and thermosetting plastics, may provide for an appealing tactile and aesthetic appearance. Additionally, tiles 140, 150, 160, 170, 180, and 190 constructed from plastic materials may be formed relatively inexpensively and may provide for a relatively high level of durability, especially within the interior of a vehicle, where the tiles 140, 150, 160, 170, 180, and 190 may experience extreme temperatures in certain geographies and seasons.

Tiles 140, 150, 160, 170, 180, and 190 may alternatively be formed using other non-plastic materials including, but not limited to metals, glass, ceramics, natural fibers, wood, paper, cardboard, composites, or combinations thereof. As an example, the tiles may be formed from metals using stamping processes. In certain embodiments, a particular look or finish may be desired where tiles of a particular construct may be desired. For example, if a vehicle interior has a brushed nickel finish, it may be desirable to construct the tiles 140, 150, 160, 170, 180, and 190 using metal, since other materials, such as wood or plastic, may clash with the overall styling or aesthetics of the vehicle interior.

It should be noted that some of the tiles 140, 150, 160, 170, 180, and 190 may be obtained by the end user, such as the driver of the vehicle, from the manufacturer or dealer of the vehicle. Other tiles may be obtained by the user or provided by a third party. For example, the heater tile 140 may be provided by the vehicle manufacturer to control a component of the vehicle, namely the heater, that is sold as a component of a new vehicle. However, the cellular telephone tile 160 may be one that is provided to the user separately from the vehicle. For example, the cellular telephone tile 160 may be provided by a manufacturer of the cellular telephone or the cellular service provider. Therefore, an end user may acquire control tiles 140, 150, 160, 170, 180, and 190 from various sources for the control of various components. There may be standards set for the dimensions and the look and feel of tiles acquired from various sources, so that tiles are interchangeable and usable across multiple platforms. Further, tiles may be procured with a choice of types. For example, one may procure a wood, metal, or plastic tile for the same control function depending on the look and finish of the user's vehicle.

While shown in the form of a flat square piece, it will be appreciated that tiles may be in any suitable form, including, but not limited to, knobs, dials, sliders, or ridged surfaces. Certain forms of tiles may provide for an appealing tactile experience. In one aspect, such tiles may mimic active dials that users may be familiar with, but may be passive in nature. Furthermore, the tiles of various forms may, in certain embodiments, provide haptic feedback, such as vibration or rumbling. It should also be appreciated that the tiles may be mounted to the control panel 120 using any suitable elements for mounting including, but not limited to, magnetic mounting, hook and loop fasteners, such as Velcro®, mechanical fasteners, screws, allen screws, nails, bosses, adhesives, or combinations thereof.

Figure 5:
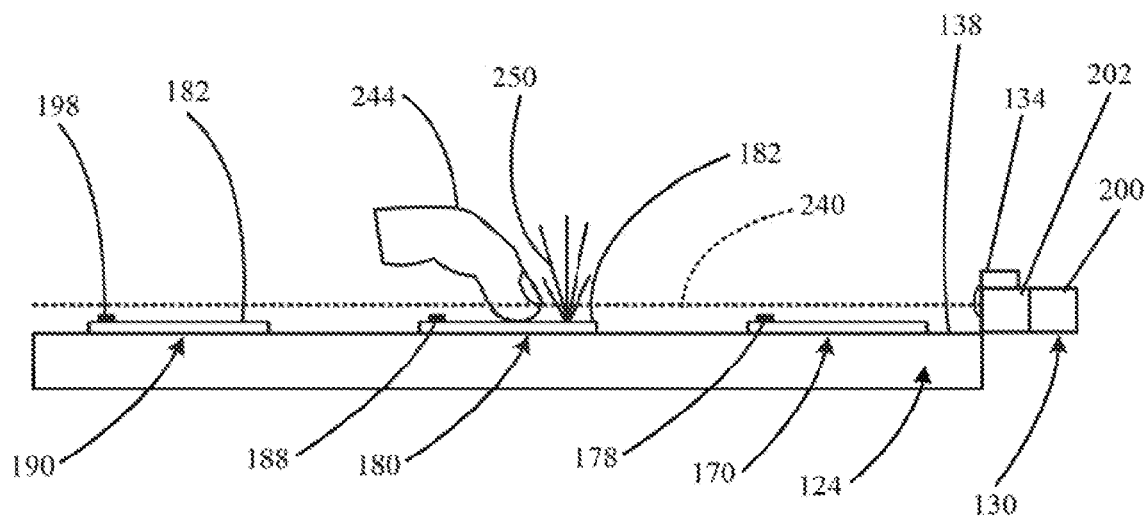
FIG. 5 is a simplified side view schematic diagram illustrating the operation of the example control panel of FIG. 2 operating in accordance with embodiments of the disclosure.

Referring now to FIG. 5, the mechanism for detecting actuation of each of the tiles 140, 150, 160, 170, 180, and 190 in accordance with certain embodiments is disclosed. A laser plane 240, as emitted by the illumination source 130, is shown above and in close proximity of the tiles 170, 180, and 190, along with the front surface 138 of the center console 120. When an object, such as a person's finger 244 comes in proximity of and perturbs the laser plane 244, optical scattering 250 of some of the light projected in the laser plane 240 may result. The scattered light may in turn be detected by the image sensor 134 and in turn produce a signal indicative of the scattered light. In one aspect, the image sensor may generate an image and a corresponding image signal that incorporates each of the ridges 178, 188, and 198 corresponding to tiles 170, 180, and 190, respectively, as well as the optical scatter 250 resulting from reflections from the finger 244. In one aspect, each of the ridges 178, 188, and 198 may be unique and therefore distinguishable from each other. The unique ridges 178, 188, and 198 may further be used to identify the corresponding tiles 170, 180, and 190. Further yet, the position of the optical scatter 250 relative to each of the ridges 176, 186, and 196 may be ascertained from the image sensor signal. Therefore, the position of the finger 244 may be ascertained relative to the ridges 178, 188, and 198 based on the image signal provided by the image sensor. If the ridges 178, 188, and 198 can further be attributed to a particular functionality, it may be possible to determine a functionality of a component that corresponds to the touching of a particular tile 170, 180, and 190 with the finger 244.

Figure 6:
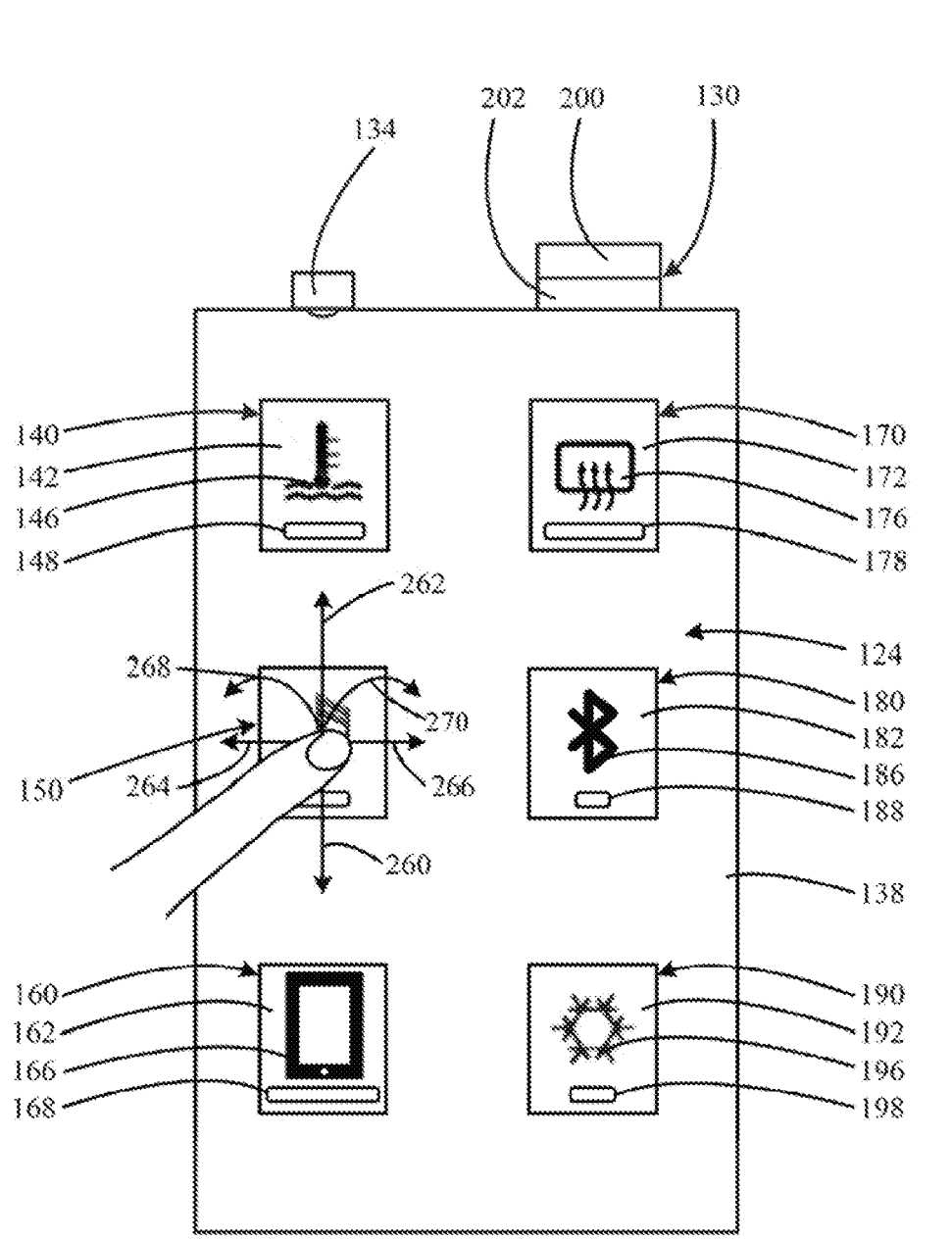
FIG. 6 is a simplified front view schematic diagram illustrating the operation of the example control panel of FIG. 2 operating in accordance with embodiments of the disclosure.

Referring now to FIG. 6, it is illustrated that the image sensor 134 may provide an image sensor signal repeatedly to show movement of the finger 244. For example, the image sensor 134 may be able to detect a tapping, such as a double tap, of the finger 244 on the surface of a tile, such as tile 150. A double tap after selecting one of the tiles, such as tile 150, may be indicative of a particular functionality of a component associated with the particular tile. For example, a double tap of the music tile 150 may be indicative of toggling, or turning on or turning off, of music. Therefore, one may first select the music tile 150 by touching the front surface 152 of the tile 150, followed by double tapping the front surface 152 to indicate a desire to turn on the music.

The repeated sampling by the image sensor 134 at a particular frame rate may enable detecting various other movements of the finger 144. For example, the image sensor 134 may be able to detect a finger movement down as indicated by arrow 260, a finger movement up as indicated by arrow 262, a movement left as indicated by arrow 264, a movement right as indicated by arrow 266, a movement in a counter-clockwise direction as indicated by arrow 268, and a movement in a clockwise direction as indicated by arrow 270. Each of these finger 244 movements may be indicative of a particular functionality associated with a particular the that is desired by the user of the center console 120. Continuing with the non-limiting example of the music tile 150, once the user has selected the tile 150, the user may provide additional commands based on further movement of the user's finger 244. A down movement 260 may be associated, for example, with a decrease in volume of the music. Likewise, an up movement may be associated with an increase in the volume of the music. The side to side movements 264 and 266 may be used to change the speaker balance of the music or provide frequency discriminating equalization of the music. The counter clockwise 268 and clockwise 270 movements may be used to tune a radio or jog through a music playlist to select a particular song.

Although repeated sampling and movement tracking of the finger 244 by the image sensor 134 is illustrated in the context of music control, it will be appreciated that finger 134 movements may be translated into controls for components in a variety of contexts. For example, particular finger 244 movements may increase or decrease the temperature of the heater system or set the velocity of forced air for the air conditioning system.

Figure 7:
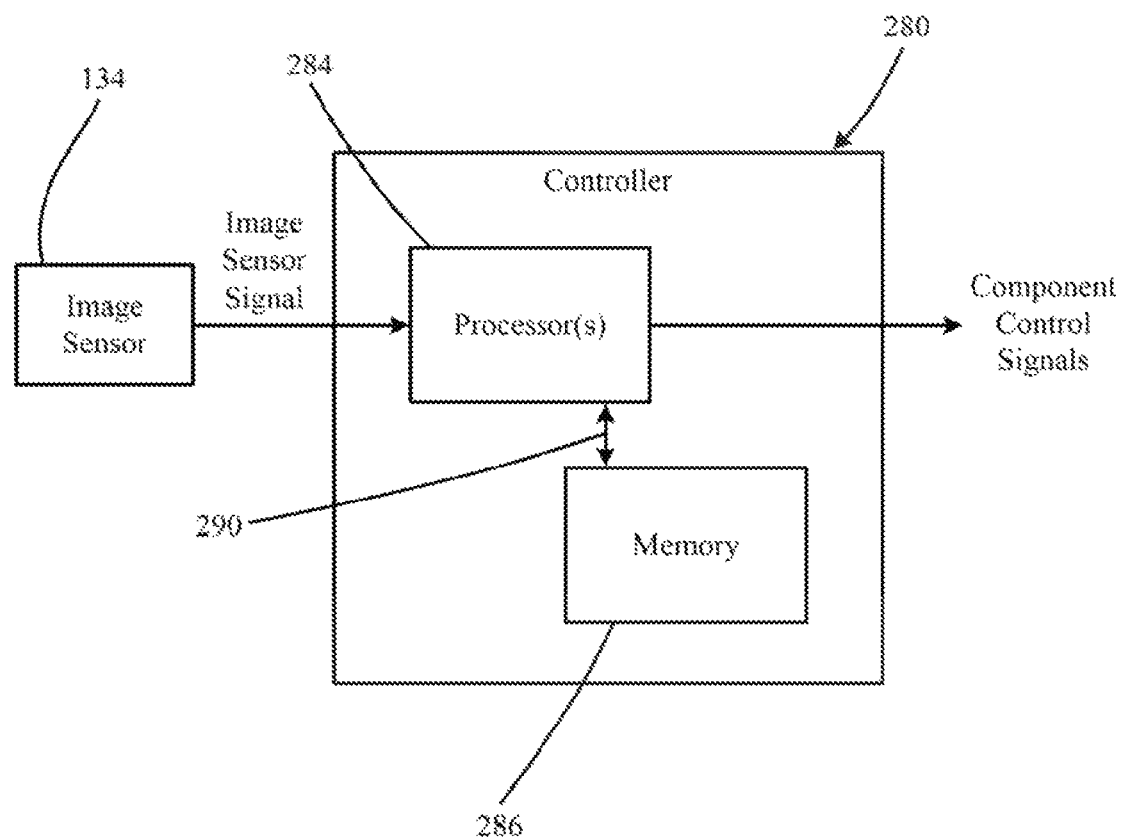
FIG. 7 is a simplified block diagram illustrating an example system for receiving sensor input from the control panel of FIG. 2 and providing component control signals in accordance with embodiments of the disclosure.

Referring now to FIG. 7, an example system 280 for providing component control signals based on user interaction with reconfigurable control panels, such as the center console 120 in accordance with embodiments of the disclosure is illustrated. The system 280 may include one or more processors 284 communicatively coupled to an electronic memory 286 via a communicative link 290. The one or more processors 284 may further be communicatively coupled to the image sensor 134 and receive image sensor signals generated by the image sensor 134.

The one or more processors 284 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The system 280 may also include a chipset (not shown) for controlling communications between the processor(s) 284 and one or more of the other components of the system 280. In certain embodiments, the system 280 may be based on an Intel® Architecture system and the one or more processors 284 and chipset may be from a family of Intel® processors and chipsets, such as the Intel® Atom® processor family. The one or more processors 284 may also include one or more application-specific integrated circuits (ASICs) or application-specific standard product (ASSPs) for handling specific data processing functions or tasks.

The memory 286 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereo.

In certain embodiments, the one or more processors 284 may be part of an in-vehicle infotainment (IVI) system. In other embodiments the one or more processors 284 may be dedicated to the system 280 for providing component control signals. Therefore, in such embodiments, the system 280 is separate from the IVI system. However, the system 280 may optionally communicate with the IVI system of the vehicle. It should also be noted that the system 280 may be part of or otherwise associated with a main computer of the vehicle. The software associated with the system 280 may further be stored on a server or a cloud server and may be transferred to the system 280 of the vehicle via one or more of a wired connection, a wireless connection, a smart key, a universal serial bus (USB) drive, or the like.

During operation of the system 280, the one or more processors 284 may receive image sensor signals from the image sensor 134. As discussed with reference to FIGS. 5 and 6, the image sensor signal may be provide information on the location of an object, such as a finger 244, relative to one or more tiles 140, 150, 160, 170, 180, and 190. Therefore, the one or more processors 284 may analyze the image sensor signal to determine if a user has touched one or more of the tiles 140, 150, 160, 170, 180, and 190. The determination may be made by analyzing the location of optical scattering 250 from the finger 244 perturbing the laser plane 240 relative to the location of one or more of the physical markers in the form of tactile ridges 148, 158, 168, 178, 188, and 198 provided on each of the tiles 140, 150, 160, 170, 180, and 190. For example, if optical scattering 250 is detected in proximity of the ridge 188, then the one or more processors may determine that the user intended to touch the Bluetooth® controller tile 180. In one aspect, the electronic memory 286 may store software programs or other instruction sets, that when run on the one or more processors 284, enables the determination of the tiles that were touched by the finger 244 based upon the image sensor signal provided by the image sensor 134.

In certain embodiments, the software and programs, as stored on the electronic memory 286, may incorporate additional logic for ascertaining if a touch by the user's finger 244 was intentional. In certain cases, especially in a vehicle setting, one may touch one or more of the tiles 140, 150, 160, 170, 180, and 190 unintentionally. For example, if a user's finger 244 is close to the center console 120 and the vehicle travels over a bump, the finger may accidentally touch one or more of the tiles 140, 150, 160, 170, 180, and 190 of the center console 120. Therefore, in addition to ascertaining the location of the optical scattering and identifying tiles 140, 150, 160, 170, 180, and 190 according to their respective ridges 148, 158, 168, 178, 188, and 198, the one or more processors may additionally analyze the movement of the finger 244 to determine if a touch event was intentional. For example, if the one or more processors 284, based on the image sensor signal, detects a touch by the finger 244, but subsequent to the touch, detects erratic movement of the finger 244, then the one or more processors may deem the initial touch event to be unintentional and ignore the same. In one aspect, the erratic movement may involve the finger 244 moving in one or more unexpected directions at a relatively high velocity followed by a relatively high deceleration of the finger 244. In other aspects, the one or more processors 284 may detect other erratic movements that may be symptomatic of the finger 244 accidentally touching the center console 120 due to movement of the vehicle.

After an initial touch event is determined by the one or more processors 284 based upon the image sensor signals, the one or more processors may continue to determine the location of the finger 244 relative to the front face 124 of the center console 120. In effect, the one or more processors 284 may be "observing" the movement of the finger 244 by tracking the movement of the optical scattering 250 to determine a user desired control action. For example, if the one or more processors 284 determine that the finger 244 intentionally touched the air conditioner tile 190, then the one or more processors 284 may analyze subsequent movement of the finger to detect one or more pre-expected movements, such as the double tap, down 260, up 262, left 264, right 266, counter clockwise 268, or clockwise 270 movement. The one or more processors 284 may determine a control action based upon the detected pre-expected movement. For example, if the left movement 264, the one or more processors may interpret that the user desires the thermostat temperature of the air conditioner to be reduced.

Once the one or more processors 284 determines a user intended action of one or more components, the one or more processors 284 may generate a control signal for the same. The one or more processors, may subsequently provide the control signal directly to the component or to a vehicle computer that can subsequently control the component based on the component control signal generated by the one or more processors 284. Continuing with the previous non-limiting example, if the one or more processors 284 determines that the user would like the temperature setting of the air conditioner lowered, then the one or more processors 284 may generate a control signal for the air conditioner that controls the air conditioner to lower the temperature setting. The control signals linked to each of the components may be stored on the electronic memory 286 for access by the one or more processors. In one aspect, the control signals may be stored on the electronic memory 286 organized as a lookup table. For example, if the one or more processors 284 decipher an intended control action by a user based upon the image sensor signal, the one or more processors 284 may access the electronic memo 286 to access the component control signals associated with the control action.

It should be noted that the control system shown herein for the control of components of the vehicle requires fewer electrical wiring and connectors compared to non-configurable and wired control schemes. The tiles 140, 150, 160, 170, 180, and 190 are not directly or indirectly coupled electrically to the components to which they correspond. This is quite different from non-configurable control panels where one or more switches may be electrically coupled either directly or indirectly to corresponding components with the use of conductive elements, such as connectors, wires, circuit boards, and the like. Therefore, the reconfigurable control panels, as disclosed herein, may have fewer electrical and mechanical elements that can fail during use and may provide a relatively cost effective and streamlined solution to controlling components of a vehicle. In one aspect, the manufacture of the reconfigurable center console 120 may have a relatively reduced bill of materials in comparison to non-configurable control panels. In another aspect, the reconfigurable center console 120 may have relatively fewer elements that can fail and therefore may be easier to troubleshoot and repair than a non-configurable control panel. In yet another aspect, the reconfigurable center console 120 be relatively lighter than non-reconfigurable control panels and therefore may result in fuel savings during the operation of the vehicle.

Figure 8:
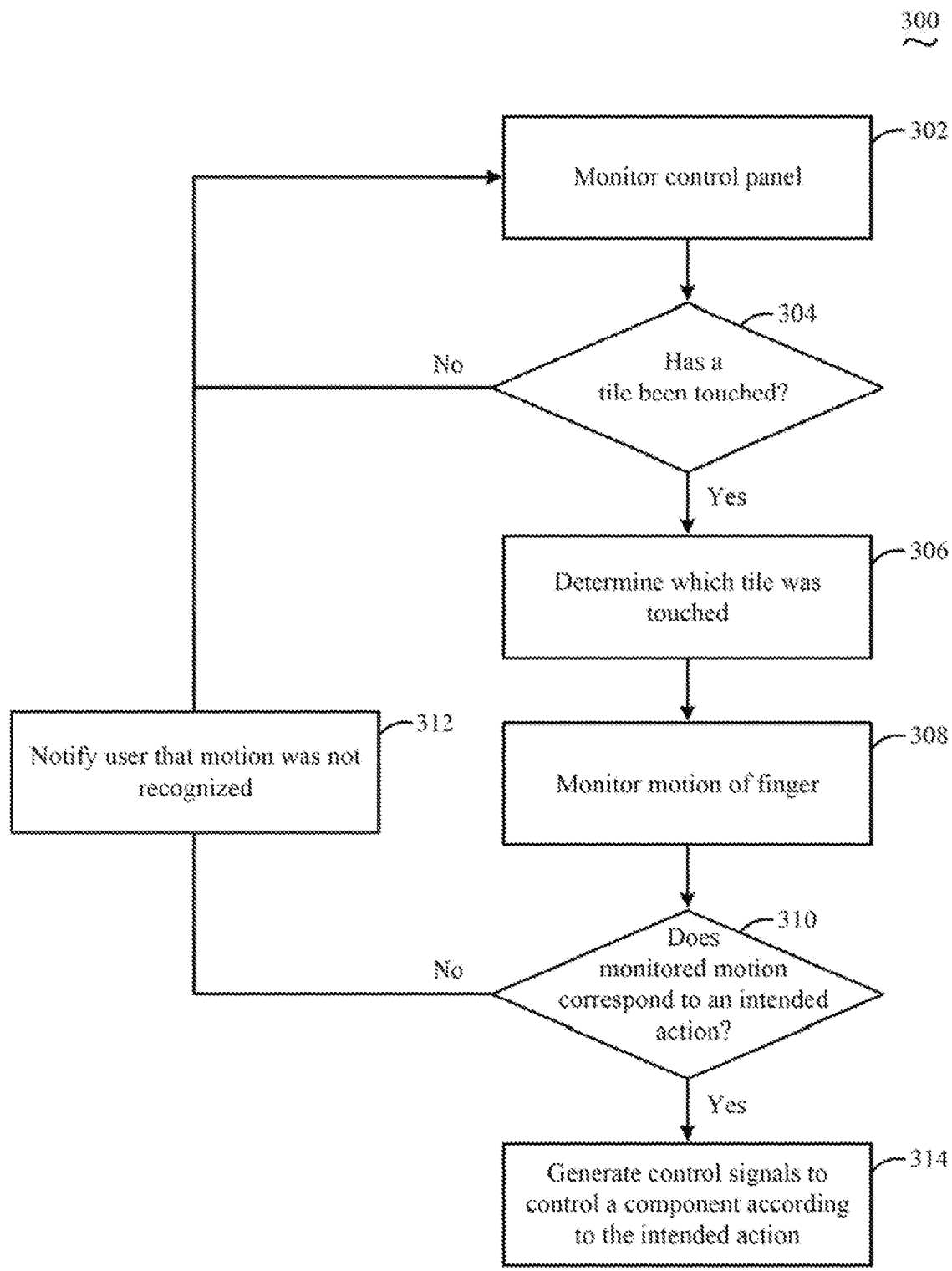
FIG. 8 is a flow chart illustrating an example method of providing control signals to control a component in accordance with embodiments of the disclosure.

Referring now to FIG. 8, a method 300 for providing component control signals in accordance with embodiments of the disclosure are illustrated. At block 302, the control panel is monitored. As shown in conjunction with FIGS. 1-3, the control panel may be monitored by the image sensor 134. Amongst other items, the image sensor 134 may detect any optical scattering 250 from a laser plane 240 generated by the illumination source 130 and in proximity of the front face 124 of the center console 120.

At block 304, it is determined if a tile has been touched. This determination may require the one or more processors 284 to monitor the image sensor signal and determine if a optical scattering 250 from the laser plane 240 is detected. In certain embodiments, the one or more processors may further determine if touching of the tile 140, 150, 160, 170, 180, and 190 by a user was intended, as discussed in reference to FIG. 7.

If it is determined at block 304 that no tiles 140, 150, 160, 170, 180, and 190 were touched, then the method 300 returns to block 302 and continues to monitor the control panel. If however, it is determined at block 304 that a tile 140, 150, 160, 170, 180, and 190 has been touched, then at block 306, it is determined which tile has been touched. The determination of which tile has been touched may entail the one or more processors comparing the location of a detected optical scattering 250 to the location of physical markers, such as tactile ridges 148, 158, 168, 178, 188, and 198 corresponding to each of the tiles 140, 150, 160, 170, 180, and 190. In one aspect, the one or more processors may determine the accessed tile 140, 150, 160, 170, 180, and 190 as the tile with corresponding ridge 148, 158, 168, 178, 188, and 198 most proximal to the optical scattering 250. In other aspects, other algorithms may be used to ascertain the tile 140, 150, 160, 170, 180, and 190 that has been touched.

Once it has been determined which tile 140, 150, 160, 170, 180, and 190 has been accessed at block 306, the motion of the finger may be monitored at block 308. As described in reference to FIG. 6, the motion of the finger 244 may be monitored by the image sensor 134 repeatedly imaging the proximity of the control panel and providing the resulting image sensor signals to the one or more processors 284. In one aspect, the one or more processors 284 may be able to track the motion of the finger 244 with a precision in the range of about 2 millimeters (mm) to about 200 mm. The one or more processors 284 may further analyze the motion of the finger 244 and determine a movement associated therewith, such as a double tap, down 260, up 262, left 264, right 266, counter clockwise 268, clockwise 270, or the like.

At block 310, it is determined if the finger 244 motion monitored corresponds to an intended control action. For example, if a particular motion, as monitored at block 308, corresponds to an available action of a component corresponding to the tile 140, 150, 160, 170, 180, and 190 selected at block 306, then it would be determined that the monitored motion does correspond to an intended control action.

If it is determined at block 310 that the monitored motion does not correspond to a control action of a component, as selected at block 306, then the method 300 notifies the user that the motion was not recognized at block 312 and returns to block 302 to continue monitoring the control panel. The notification may be by any known mechanism, including in the form of a display message, such as on an electronic display or in the form of an audio notification, such as through speakers located within the cockpit 100 of the vehicle.

If it is determined at block 310 that the monitored motion does correspond to a control action of a component, as selected at block 306, then the method proceeds to generate control signals to control a component according to the control action. As discussed with reference to FIG. 7, the control action may be determined by utilizing a database of control actions stored in the electronic memory 286 of the system 280. The generated control signals may further be provided to the corresponding component of the vehicle.

It should be noted, that the method 300 may be modified in various ways in accordance with certain embodiments of the disclosure. For example, one or more operations of method 300 may be eliminated or executed out of order in other embodiments of the disclosure. Additionally, other operations may be added to method 300 in accordance with other embodiments of the disclosure.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described for portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
   emitting a laser plane in proximity of a control panel associated with a vehicle, the control panel comprising at least one tile, wherein each of the at least one tile includes a respective corresponding physical marker extending from a surface of each of the at least one tile;
   detecting optical scattering from the laser plane; and
   determining, by at least one processor, a location of an object based in part on the optical scattering and detecting the corresponding physical marker of each of the at least one tile.

2. The method of claim 1, wherein each of the at least one tile further comprises a respective corresponding indicia.

3. The method of claim 1, wherein the location of the object comprises a position of the object relative to one or more of the at least one tile.

4. The method of claim 1, wherein the location of each of the at least one tile relative to the control panel is reconfigurable.

5. The method of claim 1, wherein the laser plane is generated by a laser diode and an optical element.

6. The method of claim 5, wherein the optical element comprises a Fresnel lens.

7. The method of claim 1, wherein detecting the optical scattering comprises monitoring the optical scattering with an image sensor.

8. The method of claim 1, wherein the object is a finger.

9. The method of claim 1, further comprising controlling a component of the vehicle based at least in part on the location of the object.

10. The method of claim 1, further comprising:
    repeatedly detecting optical scattering from the laser plane; and
    repeatedly determining the location of the object based in part on repeatedly detecting the optical scattering from the laser plane.

11. The method of claim 10, further comprising controlling a component of the vehicle based in part on the repeated determination of the location of the object.

12. A vehicle comprising:
    a control panel;
    at least one tile mounted on the control panel, wherein each of the at least one tile includes a respective corresponding physical marker extending from a surface of each of the at least one tile;
    an optical source configured to provide a laser plane;
    a sensor configured to detect optical scattering of the laser plane perturbed by an object; and
    at least one processor communicatively coupled to the sensor and configured to determine a location of the object based at least in part on the detected optical scattering and detecting the corresponding physical marker of each of the at least one tile.

13. The vehicle of claim 12, wherein each of the at least one tile further comprises a respective corresponding indicia.

14. The vehicle of claim 12, wherein the location of each of the at least one tile relative to the control panel is reconfigurable.

15. The vehicle of claim 12, wherein the optical source comprises a laser diode and an optical element.

16. The vehicle of claim 15, wherein the optical element comprises a Fresnel lens.

17. The vehicle of claim 12, wherein the sensor comprises an image sensor.

18. The vehicle of claim 12, further comprising a component of the vehicle communicatively coupled to the at least one processor and configured to be controlled by the at least one processor based at least in part on the location of the object.

19. The vehicle of claim 12, further comprising a second optical source configured to provide a second laser plane.

20. The vehicle of claim 19, wherein the sensor is further configured to detect a second optical scattering of the second laser plane perturbed by the object.

21. The vehicle of claim 20, wherein the at least one processor is further configured to:
    determine the location of the object based on the detected second optical scattering.

22. The vehicle of claim 19, wherein the wave length of the second optical source is different from the wave length of the optical source.

23. At least one non-transitory computer readable media comprising computer-executable instructions that, when executed by one or more processors associated with a vehicle, execute a method comprising:
    emitting a laser plane in proximity of a control panel associated with a vehicle, the control panel comprising at least one tile, wherein each of the at least one tile includes a respective corresponding physical marker extending from a surface of each of the at least one tile;
    detecting optical scattering from the laser plane; and
    determining a location of an object based in part on the optical scattering and detecting the corresponding physical marker of each of the at least one tile.

24. The non-transitory computer-readable media of claim 23, wherein the method further comprises controlling a component of the vehicle based at least in part on the location of the object.

25. The non-transitory computer readable media of claim 23, wherein the method further comprises:
  repeatedly detecting optical scattering from the laser plane; and,
  repeatedly determining the location of the object based in part on repeatedly detecting the optical scattering from the laser plane.

26. The non-transitory computer readable media of claim 25, wherein the method further comprises controlling a component of the vehicle based in part on the repeated determination of the location of the object.

* * * * *